Patented May 7, 1940

2,199,992

UNITED STATES PATENT OFFICE 2,199,992

STABILIZATION OF POLYVINYL RESINS

Joseph B. Hale, Rochester, N. Y., assignor to Eastman Kodak Company, Rochester, N. Y., a corporation of New Jersey No Drawing. Application March 5, 1937,
Serial No. 129,249

8 Claims. (Cl. 260—73)

This invention relates to the stabilization of polyvinyl resins by subjecting them to a catalytic or electrolytic hydrogenation.

Polyvinyl resins, prepared by the usual methods, exhibit poor stability, as regards color, and exhibit a loss in viscosity, finally becoming brittle upon standing. For instance, a product can be made from a polyvinyl resin and a month later the product might be dark and degraded. I presumed, therefore, that there was some impurity present in the resin which catalyzed its disintegration. If this were true, it seemed that this difficulty could be overcome by destruction of this impurity, such as by hydrogenating to an ineffective form. Pursuant to this conclusion, I subjected polyvinyl resins to hydrogenating treatments and discovered that the resulting products exhibited much better stability than where there had been no hydrogenation. It is to be understood that my invention is not to be limited to this theory as the instability may be due to the presence of unstable groups or unsaturated linkages or both instead of or in addition to an impurity.

I have found that the stabilization may be carried out applying catalytic or electrolytic reduction to the polyvinyl resin while in solution. It is more advantageous, especially in the case of the acetal resins, that the reduction take place before the heat-drying of that resin after its precipitation from its reaction mixture, as the acetal resins are rather sensitive and disintegrate much more easily than the polyvinyl acetate resins.

One object of my invention is to prepare polyvinyl resins which do not exhibit a tendency to degrade upon prolonged exposure and which do not darken when heated. Another object of my invention is to prepare polyvinyl resins which are suitable for use in photographic film base.

In the stabilization of polyvinyl acetal resins, the stabilization may take place either on the polyvinyl acetate, which is employed to prepare the polyvinyl acetal resin, or on the polyvinyl acetal itself. As explained in my application Serial No. 129,248, filed of even date, it is preferred that the stabilization occur before the heat-drying of the polyvinyl acetal from separation its reaction mixture due to the sensitivity of the acetal to degradation. Often in the recovery of the acetal from its reaction mixture some darkening or degradation occurs. If this is not objectionable, the stabilization might be carried out on the acetal after it has been recovered from its reaction mixture.

The instability of polyvinyl resins is manifested in various ways, such as the brittleness or darkening upon standing of a film prepared therefrom. The degree of instability of the resin is determined by various methods which involve the subjecting of the resin to an elevated temperature. For instance, one method of determining the stability comprises heating a sample of the resin to a high temperature, such as 180° C. in a stream of nitrogen and measuring the decomposition products by passing them over heated copper oxide thereby converting them to carbon dioxide and then collecting the carbon dioxide and weighing it. Another more preferred method is to heat the resin at 110° C. for approximately 24 hours and then measure the loss of viscosity. An appreciable loss of viscosity is indicative of an unstable resin. The viscosity measured is that of a 5% solution of the resin in acetic acid. The viscosity may be determined by any of the usual methods, such as by the rate of flow in seconds of the solution in a viscosimeter.

The catalytic stabilization of the polyvinyl resin is ordinarily carried out by adding a small amount of a hydrogenation catalyst to the solution of the resin and subjecting it to treatment with gaseous hydrogen for the time desired. The catalysts used are found generally among the metals of the first and eighth groups of the periodic table or among the derivatives of those metals. It is desirable that the catalyst or its derivative be thoroughly removed from the mass, particularly in the case of the more active metals, such as iron or copper, as otherwise the retaining of even small amounts of these metals or their derivatives might result in promotion of the degradation of the resin and thereby substitute for the impurity which would have promoted the breakdown had it not been converted to an inactive form.

The electrolytic method of stabilizing is carried out by subjecting a solution of the resin to a direct current which forms nascent hydrogen at the cathode. In this method it is desirable to enclose the anode with some sort of a porous membrane to prevent the contacting of the oxidation products formed with the bulk of the solution. Where a solvent has been employed in making the resin which is not conducive to electrolysis, it is ordinarily necessary that the resin be precipitated from its reaction mixture and dissolved in a solvent, such as alcohol, which is conducive to an electrolysis process.

My stabilization process may be employed on polyvinyl acetate, polyvinyl alcohol, polystyrenes, a polyvinyl halide, polyvinyl acetal or the like. If a stabilized acetal is desired my stabilizing process may be applied to the polyvinyl intermediate employed to prepare the acetal or to the acetal itself after its formation. If the acetal is prepared from polyvinyl alcohol either the alcohol or the polyvinyl acetate from which it is made may be stabilized by my method resulting finally in a stable acetal resin. It has been my experience that the acetal resins prepared from polyvinyl esters are more unstable than those prepared from polyvinyl alcohol and therefore my invention is particularly adapted to the first type of acetal resin.

Other fatty acid esters of polyvinyl such as polyvinyl propionate or butyrate or the heteropolymers such as polyvinyl acetate-propionate, polyvinyl acetate-butyrate or polyvinyl acetate-chloride may be stabilized by my process. The polymerization by which the resins were prepared may be catalytic or they may be prepared by photopolymerization.

The polyvinyl acetal resins generally may be stabilized by my process either by stabilizing the polyvinyl intermediates or by stabilizing the acetal resin itself after its formation. Among the acetal resins which may be stabilized are those of formaldehyde, acetaldehyde, propionaldehyde or butyraldehyde or mixtures of these.

The polyvinyl esters which may be stabilized in accordance with my invention includes both the fully esterified and the partially hydrolyzed esters. For instance partially hydrolyzed polyvinyl acetate can be stabilized to give a good product.

The following examples illustrate stabilizing of polyvinyl acetate or polyvinyl acetal in accordance with my invention:

Example I 25 parts of polyvinyl acetate was dissolved in 75 parts of alcohol. .2 part of platinum oxide was added and the material was agitated in hydrogen for 3 hours at a pressure of one atmosphere. The platinum was centrifuged off and the resin was precipitated, washed with water and dried. The following tabulation shows the effect of the stabilizing treatment on the resin:

|  | Original viscosity | Viscosity after heating 24 hrs. at 110° C. |
| --- | --- | --- |
| Original sample before treatment | 119 | 35.4 |
| Treated sample | 127 | 107 |

After the heating, the original sample showed a slight yellow tinge whereas the stabilized resin was colorless.

Example II 50 parts of a polyvinyl acetaldehyde acetal was dissolved in 150 parts of alcohol. .3 part of platinum oxide was added and the solution was agitated under one atmosphere of hydrogen for 3 hours. The catalyst was then removed by centrifuging and the resin was precipitated, washed with water and dried. The following tabulation shows the improvement in the stability of the resin:

|  | Original viscosity | Viscosity after heating 24 hrs. at 110° C. |
| --- | --- | --- |
| Untreated resin | 209 | 15 |
| Treated resin | 197 | 192 |

Example III 25 parts of a polyvinyl acetaldehyde acetal was treated, as described in Example I, except that .2 part of Raney nickel catalyst was used in place of the platinum oxide. The following tabulation shows that the resin was stable.

|  | Original viscosity | Viscosity after heating 24 hrs. at 110° C. |
| --- | --- | --- |
| Treated sample | 148 | 109 |

Example IV 25 parts of a polyvinyl butyraldehyde acetaldehyde acetal was treated, as described in Example I. The tabulation shows the stability of the resin.

|  | Original viscosity | Viscosity after heating 24 hrs. at 110° C. |
| --- | --- | --- |
| Untreated sample | 194 | 8.4 |
| Treated sample | 212 | 148 |

Example V 25 parts of polyvinyl acetate were dissolved in 75 parts of alcohol. .2 part of platinum was added and the mass was agitated for 2 hours in one atmosphere of hydrogen. The platinum was removed by centrifuging and the mixture was treated with 13 parts of paraldehyde and 8 parts of concentrated hydrochloric acid and allowed to stand 4 days at 40° C. The resulting polyvinyl acetal was precipitated, washed with water and dried. The viscosity of the acetal was 110 and after heating at 110° C. for 24 hours, it was 103. A sample of polyvinyl acetate converted to the acetal without the hydrogenation treatment exhibited an original viscosity of 102 which went down to 23 after heating.

Example VI 50 parts of polyvinyl acetaldehyde acetal was dissolved in 300 parts of ethyl alcohol. 3 parts of concentrated hydrochloric acid was added and the solution was reduced for 3 hours using a revolving silver cathode and a platinum gauze anode. The anode was placed in a porous cup so that oxidation products formed were kept isolated from the rest of the solution. A potential of 110 volts produced a current of about .2 ampere during the reduction. The reduced resin was precipitated, washed with water and dried. The polyvinyl acetal resin was found to be of good stability.

Example VII 100 parts of polyvinyl acetate was dissolved in 500 parts of alcohol. 5 parts of concentrated hydrochloric acid was added and the solution was reduced electrolytically in the same manner as described in Example VI. After the reduction, 80 parts of paraldehyde and 40 parts of concentrated hydrochloric acid were added and the mixture was allowed to stand at 40° C. for 4 days. The polyvinyl acetal formed was precipitated, washed with water and dried. The product formed was of good stability.

*Example VIII*

This example illustrates the stabilization of a partial polyvinyl acetal resin.

A partial polyvinyl acetal resin for example a polyvinyl butyraldehyde acetal resin made by condensing butyraldehyde with polyvinyl alcohol according to French Patent No. 792,661, of Carbide and Carbon Chemicals Corporation, in which from about 2.5 to about 4 molecules of polyvinyl alcohol was combined with each molecule of butyraldehyde was dissolved in alcohol and a small amount of catalytic platinum was added thereto. The mass was kept in one atmosphere of hydrogen for 3 hours during which it was agitated. The platinum catalyst was centrifuged off and the acetal resin was precipitated, washed with water and dried. A product of good stability resulted which was formed to be particularly suitable for use in the manufacture of laminated glass.

The resins stabilized in accordance with my invention are particularly adapted for use in products such as photographic film or laminated glass in which the transmission of light is important, and consequently darkening or degradation should be avoided. These resins are also suitable for use in the preparation of other commercial products such as artificial yarn, lacquers, impregnated textiles, laminations with wood, metal, paper and glass or other transparent sheeting or for waterproofing. These esters may be mixed with other plastic materials such as cellulose acetate, gums, synthetic or natural resins, waxes or oils to form valuable compositions. These resins may be employed to prepare wrapping material as they retain their transparency due to their stability.

The catalysts which I may employ are generally the hydrogenation catalysts which are found in the first and eighth series of the periodic table. Some hydrogenation catalysts which may be employed in addition to those listed are platinum black, colloidal platnium, cadmium, nickel catalysts of various kinds, copper or mixtures of these catalysts.

In the testing of polyvinyl acetal resins by heating at 110° C. for 24 hrs. and observing the drop in viscosity in a 5% solution of the resin in acetic acid I find that although it is preferable that there be substantially no drop in viscosity when the resin is to be employed for the base for photographic film, nevertheless the viscosity may be dropped as much as half by this heating treatment and the resin will still be satisfactory for use in the manufacture of photographic film.

The final step in the manufacture of polyvinyl acetal resins is the drying by the application of heat. The resins can only be conveniently and practically dried in large quantities by using an elevated temperature. This drying is carried out by subjecting the resin to a temperature of 65-70° C. under conditions whereby the moisture is removed such as by a current of dry heated air. Where the term "heat-drying" is employed herein it refers to this drying of the resin by using an elevated temperature under drying conditions. All of the resins stabilized as described in the examples were finally heat-dried to remove the moisture therefrom.

I claim:

1. A hydrogen-stabilized polyvinyl acetal resin.
2. A transparent sheet essentially consisting of a hydrogen-stabilized polyvinyl acetal resin.
3. A hydrogen-stabilized polyvinyl acetaldehyde acetal resin.
4. A hydrogen-stabilized polyvinyl mixed acetal resin.
5. A hydrogen-stabilized polyvinyl butyraldehyde acetaldehyde acetal resin.
6. A process of stabilizing a polyvinyl acetal resin which comprises subjecting a solution of it to a hydrogenation.
7. A process of stabilizing a polyvinyl acetal resin which comprises subjecting a solution of it to an electrolytic hydrogenation.
8. A process of stabilizing a polyvinyl acetal resin which comprises subjecting it to the action of hydrogen in the presence of a platinum hydrogenation catalyst.

JOSEPH B. HALE.